US011223938B2

(12) United States Patent
Yoon et al.

(10) Patent No.: US 11,223,938 B2
(45) Date of Patent: Jan. 11, 2022

(54) ELECTRONIC DEVICE AND METHOD OF CONTROLLING THEREOF

(71) Applicant: SAMSUNG ELECTRONICS CO., LTD., Suwon-si (KR)

(72) Inventors: Sukun Yoon, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/863,400

(22) Filed: Apr. 30, 2020

(65) Prior Publication Data
US 2020/0359189 A1 Nov. 12, 2020

(30) Foreign Application Priority Data

May 8, 2019 (KR) ........................ 10-2019-0053539

(51) Int. Cl.
H04W 4/90 (2018.01)
H04W 4/029 (2018.01)
H04L 29/12 (2006.01)

(52) U.S. Cl.
CPC .......... H04W 4/90 (2018.02); H04L 61/2007 (2013.01); H04W 4/029 (2018.02)

(58) Field of Classification Search
CPC ......... H04W 4/029; H04W 4/80; H04W 4/02; H04W 84/12; H04W 4/023; H04W 64/00;
(Continued)

(56) References Cited

U.S. PATENT DOCUMENTS 6,334,059 B1  12/2001 Stilp et al.
6,907,238 B2   6/2005 Leung
(Continued)

FOREIGN PATENT DOCUMENTS

CN  103125127 A  5/2013
CN  105546931 A  5/2016
(Continued)

OTHER PUBLICATIONS

Communication dated Jul. 6, 2020 issued by the European Intellectual Property Office in counterpart European Application No. 20171613.1.
International Search Report dated Aug. 20, 2020 issued by the International Searching Authority in counterpart International Application No. PCT/KR2020/005863 (PCT/ISA/210).
International Written Opinion dated Aug. 20, 2020 issued by the International Searching Authority in counterpart International Application No. PCT/KR2020/005863 (PCT/ISA/237).
Communication dated Mar. 30, 2021 issued by the State Intellectual Property Office of P.R. China in counterpart Chinese Application No. 202010381327.3.
(Continued)

Primary Examiner — Ernest G Tacsik
(74) Attorney, Agent, or Firm — Sughrue Mion, PLLC

(57) ABSTRACT

An electronic device is provided. The electronic device includes: a communicator including a first wireless communication module and a second wireless communication module; at least one memory storing instructions; and at least one processor configured to execute the instructions to: control the first wireless communication module to obtain first identification information, of an external electronic device, for performing wireless communication via the first communication protocol, control the second wireless communication module to obtain second identification information for performing wireless communication via the second communication protocol, and based on the second identification information being identified to be associated with the external electronic device according to a comparison between the first identification information and the second identification information, associate the second identification information with location information of the electronic device and transmit the associated information to a server.

20 Claims, 10 Drawing Sheets

(58) Field of Classification Search
CPC .. H04W 8/005; H04W 4/021; H04L 61/2007; H04L 61/6022; G01S 5/0252
See application file for complete search history.

(56) References Cited

U.S. PATENT DOCUMENTS

| | | | |
|---|---|---|---|
| 7,623,447 B1 | 11/2009 | Faccin et al. | |
| 8,627,075 B2 | 1/2014 | Ikeda et al. | |
| 9,100,782 B2 | 8/2015 | Baek et al. | |
| 9,408,176 B2 | 8/2016 | Baek et al. | |
| 9,433,011 B2 | 8/2016 | Hwang et al. | |
| 9,699,602 B2 | 7/2017 | Cho et al. | |
| 9,860,688 B2 | 1/2018 | Kulkarni et al. | |
| 10,149,272 B2 | 12/2018 | Stojanovski et al. | |
| 2006/0193447 A1 | 8/2006 | Schwartz | |
| 2013/0177006 A1* | 7/2013 | Baek | H04W 64/00 370/338 |
| 2013/0251115 A1 | 9/2013 | Nelson | |
| 2014/0236725 A1* | 8/2014 | Golden | G06Q 30/0267 705/14.58 |
| 2015/0111610 A1 | 4/2015 | Hwang et al. | |
| 2015/0189426 A1* | 7/2015 | Pang | H04R 3/00 381/77 |
| 2015/0223188 A1 | 8/2015 | Baek et al. | |
| 2015/0382140 A1 | 12/2015 | Cho et al. | |
| 2016/0014588 A1* | 1/2016 | Shin | H04W 4/023 455/41.1 |
| 2016/0066137 A1 | 3/2016 | Kulkarni et al. | |
| 2016/0150395 A1* | 5/2016 | Kim | H04W 4/02 455/435.1 |
| 2016/0262126 A1 | 9/2016 | Hillier et al. | |
| 2017/0142549 A1 | 5/2017 | Herbert et al. | |
| 2017/0176602 A1 | 6/2017 | Lee et al. | |
| 2018/0082285 A1* | 3/2018 | Prabhakar | H04W 76/10 |
| 2018/0121493 A1* | 5/2018 | Pallas | G06F 16/2379 |
| 2018/0192460 A1 | 7/2018 | Huh | |
| 2018/0367667 A1 | 12/2018 | Tran | |
| 2019/0069266 A1 | 2/2019 | Han et al. | |

FOREIGN PATENT DOCUMENTS

| | | |
|---|---|---|
| CN | 105659682 A | 6/2016 |
| CN | 107004172 A | 8/2017 |
| JP | 2002-291039 A | 10/2002 |
| JP | 2014-123350 A | 7/2014 |
| KR | 10-2003-0010836 A | 2/2003 |
| KR | 10-2005-0058475 A | 6/2005 |
| KR | 10-0735001 B1 | 7/2007 |
| KR | 10-2011-0131654 A | 12/2011 |
| KR | 10-2016-0001418 A | 1/2016 |
| KR | 101598809 B1 | 3/2016 |
| KR | 10-2016-0094018 A | 8/2016 |
| KR | 1020170074095 A | 6/2017 |
| KR | 10-2017-0130374 A | 11/2017 |
| KR | 10-2019-0020940 A | 3/2019 |
| WO | 2017/083212 A1 | 5/2017 |

OTHER PUBLICATIONS

Communication dated Oct. 20, 2021 issued by the State Intellectual Property Office of the P.R.China in application No. 202010381327.3.

* cited by examiner

ELECTRONIC DEVICE AND METHOD OF CONTROLLING THEREOF

CROSS-REFERENCE TO RELATED APPLICATION(S)

This application is based on and claims priority under 35 U.S.C. § 119 to Korean Patent Application No. 10-2019-0053539, filed on May 8, 2019, in the Korean Intellectual Property Office, the disclosure of which is incorporated by reference herein in its entirety.

BACKGROUND

1. Field

The disclosure relates to an electronic device and a method of controlling thereof, and more particularly, to an electronic device that acquires identification information of another electronic device, and transmitting the identification information to the outside correspondingly to information stored in the electronic device.

2. Description of Related Art

In the case of attempting an emergency rescue call by using a mobile device such as a smartphone, the smartphone may acquire a Wi-Fi signal, a Bluetooth (BT) signal, a Global Positioning System (GPS) signal, etc., that can be acquired in the surroundings and transmit the signals together to a server supporting an emergency rescue service.

The server supporting an emergency rescue service may identify the location of the person who requested emergency rescue by using the acquired Wi-Fi signal, BT signal, GPS signal, etc., and transmit the identified location to the emergency rescue force to be dispatched.

SUMMARY

Provided are an electronic device and a method of controlling the same, that acquires identification information of another electronic device, and transmits the identification information to a server in correspondence with location information stored in the electronic device.

Additional aspects will be set forth in part in the description which follows and, in part, will be apparent from the description, or may be learned by practice of the presented embodiments.

In accordance with an aspect of the disclosure, an electronic device includes: a communicator including a first wireless communication module configured to perform wireless communication via a first communication protocol and a second wireless communication module configured to perform wireless communication via a second communication protocol; at least one memory storing instructions; and at least one processor configured to execute the instructions to: control the first wireless communication module to connect to an access point, control the first wireless communication module to obtain, through the access point, first identification information of an external electronic device for performing wireless communication via the first communication protocol, control the second wireless communication module to obtain second identification information for performing wireless communication via the second communication protocol, and based on the second identification information being identified to be associated with the external electronic device according to a result of a comparison between the first identification information and the second identification information, associate the second identification information with location information of the electronic device and transmit the second identification information and the location information to an external server through the first wireless communication module.

The at least one processor may be further configured to execute the instructions to: control the first wireless communication module to transmit, toward the external electronic device via the access point, a request for the first identification information of the external electronic device.

The second identification information of the external electronic device is broadcast according to a predetermined cycle.

The location information of the electronic device may include at least one of global positioning system (GPS) information, address information, air pressure information, height information, information on a source of the location information, or a priority of the location information associated with the electronic device.

The at least one processor may be further configured to execute the instructions to: control the first communication module to obtain an IP address from a server accessed by using the access point, and obtain the location information of the electronic device based on the obtained IP address.

The at least one processor may be further configured to execute the instructions to: control the first wireless communication module to obtain at least one of GPS information, address information, or air pressure information stored in a mobile device, and obtain the location information of the electronic device by using the obtained at least one of the GPS information, address information, or air pressure information.

The at least one processor may be further configured to execute the instructions to: control the first wireless communication module to obtain the location information as an input through a mobile device.

The electronic device may further include: a display, wherein the at least one processor may be further configured to execute the instructions to: control the display to display a user interface for receiving an input of the location information.

The at least one processor may be further configured to execute the instructions to: based on obtaining, from a server by using the first wireless communication module, a new IP address that is not a pre-stored IP address, output a notification requesting to correct the location information of the electronic device.

The at least one processor may be further configured to execute the instructions to: based on obtaining, from the server by using the first wireless communication module, a new IP address that is not a pre-stored IP address, obtain new location information based on the obtain new IP address, and change the location information of the electronic device to the new location information.

In accordance with another aspect of the disclosure, a method of controlling an electronic device includes: controlling a first wireless communication module, configured to perform wireless communication via a first communication protocol, to connect to an access point; controlling the first wireless communication module to obtain, through the access point, first identification information of an external electronic device; controlling a second wireless communication module, configured to perform wireless communication via a second communication protocol, to obtain second identification information; and based on the second identification information being identified to be associated with the external electronic device according to a result of a comparison between the first identification information and the second identification information, associating the second identification information with the location information of the electronic device and transmitting the second identification information and the location information to an external server through the first wireless communication module.

The controlling the first wireless communication module to obtain the first identification information may include: controlling the first wireless communication module to transmit, toward the external electronic device via the access point, a request for the first identification information of the external electronic device.

The second identification information of the external electronic device may be broadcast according to a predetermined cycle.

The controlling method may further include: controlling the first communication module to obtain an IP address from a server accessed by using the access point, and obtain the location information of the electronic device based on the acquired IP address.

The controlling method may further include: controlling the first wireless communication module to obtain at least one of GPS information, address information, or air pressure information stored in a mobile device, and obtaining the location information of the electronic device by using the obtained at least one of the GPS information, address information, or air pressure information.

The controlling method may further include: controlling the first wireless communication module to obtain the location information as an input through a mobile device.

The controlling method may further include: providing a user interface for receiving an input of the location information.

The controlling method may further include: based on obtaining, from a server, a new IP address that is not a pre-stored IP address, outputting a notification requesting to correct the location information of the electronic device.

The controlling method may further include: based on obtaining, from the server, a new IP address that is not a pre-stored IP address, obtaining new location information based on the obtained new IP address, and changing the location information of the electronic device to the new location information.

In accordance with another aspect of the disclosure, a non-transitory computer-readable storage medium stores at least one instruction executable by at least one processor to perform: controlling a first wireless communication module, configured to perform wireless communication via a first communication protocol, to connect to an access point; controlling the first wireless communication module to obtain, through the access point, first identification information of an external electronic device; controlling a second wireless communication module, configured to perform wireless communication via a second communication protocol, to obtain second identification information; and based on the second identification information being identified to be associated with the external electronic device according to a result of a comparison between the first identification information and the second identification information, associating the second identification information with the location information of the electronic device and transmitting the second identification information and the location information to an external server through the first wireless communication module.

In accordance with another aspect of the disclosure, an electronic device includes: a communicator including a first wireless communication module configured to perform wireless communication via a first communication protocol and a second wireless communication module configured to perform wireless communication via a second communication protocol; at least one memory storing instructions; and at least one processor configured to execute the instructions to: control the first wireless communication module to obtain first identification information, of an external electronic device, for performing wireless communication via the first communication protocol, control the second wireless communication module to obtain second identification information, of the external electronic device, for performing wireless communication via the second communication protocol, and based on the second identification information being identified to be associated with the external electronic device according to a result of a comparison between the first identification information and the second identification information, associate the second identification information with location information of the electronic device and transmit the second identification information and the location information to an external server.

The at least one processor may be further configured to execute the instructions to: control the first wireless communication module to transmit, toward the external electronic device, a request for the first identification information of the external electronic device.

The location information of the electronic device may include at least one of global positioning system (GPS) information, address information, air pressure information, height information, information on a source of the location information, or a priority of the location information associated with the electronic device.

The at least one processor may be further configured to execute the instructions to: control the first communication module to obtain an IP address from a server accessed by using an access point, and obtain the location information of the electronic device based on the obtained IP address.

The at least one processor may be further configured to execute the instructions to: control the first wireless communication module to obtain at least one of GPS information, address information, or air pressure information stored in a mobile device, and obtain the location information of the electronic device by using the obtained at least one of the GPS information, address information, or air pressure information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
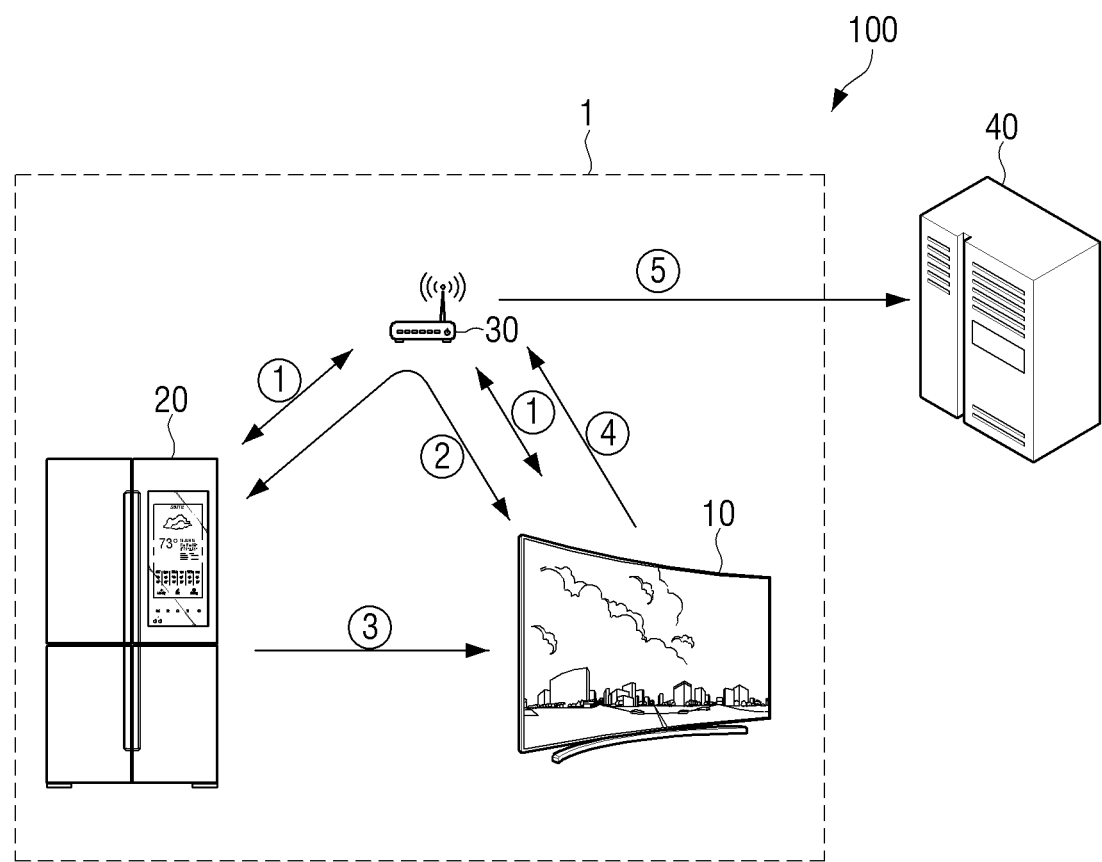
FIG. 1 is a diagram illustrating a situation wherein an electronic device according to an embodiment transmits, to a server, identification information acquired by using an identification information acquisition system acquiring identification information of another electronic device.

When attempting an emergency rescue call by using a smartphone, a server supporting a emergency rescue service stores geographical location information corresponding to a Wi-Fi signal and a Bluetooth (BT) (e.g., Bluetooth Low Energy (BLE)) signal to allow for acquiring a Wi-Fi signal and a BT signal around the smartphone and providing location information to an emergency rescue force to be dispatched.

Accordingly, there may be an inconvenience that, to support the aforementioned service in a user's home, geographical location information should be matched for each of a plurality of electronic devices such as a refrigerator and a television (TV), and the information should be transmitted to a server providing the emergency rescue service.

An electronic device according to one or more embodiments of the disclosure may be of any of various forms. An electronic device may include, for example, a portable communication device (e.g., a smartphone), a computer device, a portable multimedia device, a portable medical device, a camera, a wearable device, a home appliance, etc. It is understood, however, that an electronic device according to one or more other embodiments is not limited to the aforementioned devices.

The various embodiments of the disclosure and the terms used to describe the embodiments are not intended to limit the technical characteristics described in the disclosure to specific embodiments, but they should be interpreted to include various modifications, equivalents, or alternatives of the embodiments. Meanwhile, with respect to the detailed description of the drawings, similar or related components may be designated by similar reference numerals. Also, a singular form of a noun corresponding to an item may include one or several of the item, unless defined or plainly presented differently in the context. Also, in this specification, each of the phrases "A or B," "at least one of A and B," "at least one of A or B," "A, B, or C," "at least one of A, B, and C," and "at least one of A, B, or C" may include any one of the items listed together with the corresponding phrase among the phrases, or all possible combinations thereof. In addition, terms such as "first," "second," and the like may be used just to distinguish a component from another component, and are not intended to limit components in other aspects (e.g., importance or order). Meanwhile, where it is mentioned that a component (e.g., a first component) is "coupled" or "connected" with or to another component (e.g., a second component) together with terms such as "functionally" and "communicatively" or without such terms, it is understood that the component may be connected with the another component directly (e.g., via wire), wirelessly, or through a third component.

Also, the term "module" used in the disclosure may include a unit implemented as at least one of hardware, software, or firmware, and may be interchangeably used with, for example, terms such as a logic, a logical block, a component, or a circuit. In addition, a module may be a component constituted as an integrated body or a minimum unit or a part of the component performing one or more functions. For example, according to an embodiment, a module may be implemented in the form of an application-specific integrated circuit (ASIC).

FIG. 1 is a diagram illustrating a situation wherein an electronic device 10 according to an embodiment transmits, to a server, identification information acquired by using an identification information acquisition system acquiring identification information of another electronic device.

Referring to FIG. 1, a system 100 for acquiring identification information of another electronic device may include an electronic device 10, an external electronic device 20, an access point 30, and a location information server 40. It is understood that this is just an example, and one or more other embodiments of the system 100 may further include a plurality of electronic devices or a plurality of servers, and/or some components may be excluded.

The electronic device 10, the external electronic device 20, and the access point 30 may be located to be adjacent to one another in an area within a specific range, e.g., indoors 1.

The electronic device 10 may be a TV, but this is merely an example, and the electronic device 10 may be implemented in various forms including displays. For example, the electronic device 10 may be implemented as various electronic devices such as a mobile phone, a tablet PC, a digital camera, a camcorder, a laptop computer, a desktop, an electronic book terminal device, a terminal device for digital broadcasting, a personal digital assistant (PDA), a portable multimedia player (PMP), navigation, an MP3 player, a wearable device, and the like. In particular, while embodiments may be implemented in a display device of which display is large such as a TV, the disclosure is not limited thereto.

Also, the electronic device 10 may be a fixed type or a movable type, and may be a digital broadcasting receiver that can receive digital broadcasting. In addition, the electronic device 10 may include not only a flat display, but also a curved display that includes a screen having a curvature or a flexible display of which curvature can be adjusted. The output resolution of the electronic device 10 may include, for example, High Definition (HD), Full HD, Ultra HD, or a resolution higher than Ultra HD.

The electronic device 10 may include a processor and a communicator and may establish communication with another external device. The communicator may include a wireless communication module (e.g., a cellular communication module, a near field wireless communication module (e.g., a BT communication module, a wireless fidelity (Wi-Fi) communication module)), and a wired communication module (e.g., a local area network (LAN) communication module, a power line communication module).

According to an embodiment, the external electronic device 20 may be a refrigerator, but this is merely an example, and the external electronic device 20 may be implemented in various forms as a device that includes a communicator and can establish communication with an external device. For example, the external electronic device 20 may be implemented as various electronic devices such as an air purifier, a washing machine, a clothes dryer, a TV, a mobile phone, a tablet PC, a digital camera, a camcorder, a laptop computer, a desktop personal computer, an electronic book terminal device, a terminal device for digital broadcasting, a personal digital assistant (PDA), a portable multimedia player (PMP), navigation, an MP3 player, a wearable device, and the like.

The external electronic device 20 may include a processor and a communicator and may establish communication with another external device. The communicator may include a wireless communication module (e.g., a cellular communication module, a near field wireless communication module (e.g., a BT communication module, a Wi-Fi communication module)), and a wired communication module (e.g., a local area network (LAN) communication module, a power line communication module).

The electronic device 10 and the external electronic device 20 may establish communication by using Wi-Fi communication through an access point (or a gateway) 30. Wi-Fi communication is a technology of enabling wireless wideband Internet access by using a near field communication network without an exclusive line or a telephone line. Wi-Fi communication may use, for example, frequency bands of 2.4 GHz/S GHz.

The location information server 40 may establish communication with the electronic device 10 or the external electronic device 20 by using the access point 30. Also, the location information server 40 may store data (or information) acquired from the electronic device 10 or the external electronic device 20. In addition, the location information server 40 may transmit pre-stored data in response to (or based on) a request of the electronic device 10 or the external electronic device 20.

Hereinafter, a situation wherein the electronic device 10 acquires identification information of the external electronic device 20 by using the aforementioned system 100 and transmits the information to the location information server 40 is explained.

In operation ①, the electronic device 10 may establish a connection with the access point 30 by using the first wireless communication module performing wireless communication over (or via) a first communication protocol. For example, the electronic device 10 may establish communication with the access point 30 by using a wireless communication module supporting a Wi-Fi communication method.

According to an embodiment, the external electronic device 20 may also establish connection with the access point 30 by using a first wireless communication method (e.g., a Wi-Fi communication method).

In operation ②, the electronic device 10 may acquire first identification information, for performing wireless communication over (or via) the first communication protocol, of the external electronic device 20 connected to the access point 30 by using the first wireless communication module.

According to an embodiment, the electronic device 10 may acquire the first identification information of the external electronic device 20 by utilizing an address resolution protocol (ARP). The first identification information for performing wireless communication over (or via) the first communication protocol may be, for example, a Wi-Fi medium access control (MAC) address of the external electronic device 20. A Wi-Fi MAC address is unique number of or corresponding to a device and used for a Wi-Fi network, and may be set by the manufacturer of a device when the device is manufactured.

An ARP may be a protocol used to make an Internet Protocol (IP) address correspond to the physical address (e.g., a Wi-Fi MAC address) of a device connected to a Wi-Fi network on a local area network (LAN) based on the IEEE 802 standard.

For example, the electronic device 10 may acquire, from the access point 30, the IP address of the external electronic device 20 connected to the access point 30. The electronic device 10 may include the Wi-Fi MAC address of the electronic device 10, the IP address of the electronic device 10, and the IP address of the external electronic device 20 acquired from the access point 30, and transmit, to the access point 30, a request signal requesting to receive a Wi-Fi MAC address with respect to the external electronic device 20 connected to the access point 30.

The access point 30 may transmit the acquired request signal to the external electronic device 20 connected with the access point 30.

According to an embodiment, if it is identified (or based on identifying) that the IP address included in the received request signal and the IP address of the external electronic device 20 are the same, the external electronic device 20 may transmit a response signal including the Wi-Fi MAC address of the external electronic device 20 to the access point 30.

The access point 30 may transmit the acquired response signal to the electronic device 10.

In operation ③, the electronic device 10 may acquire second identification information for performing wireless communication over (or via) at least one second communication protocol by using the second wireless communication module. For example, the electronic device 10 may acquire a BT signal that can be acquired around the electronic device 10 by using a BT communication method, and acquire the second identification information included in the acquired BT signal. By way of example, in the present disclosure, the BT signal may be a Bluetooth Low Energy (BLE) signal and the BT communication method may be a BLE communication method.

The second identification information for performing wireless communication over (or via) the second communication protocol may be, for example, a BT MAC address. A BT MAC address is a unique number of or corresponding to a device used for a BT network, and may be set by the manufacturer of a device when the device is manufactured.

In operation ④, if it is identified that the second identification information is associated with the external electronic device according to a result of comparison of the first identification information and the second identification information, the second identification information may be associated with the location information of the electronic device and the information may be transmitted to the access point 30 through the first wireless communication module.

In operation ⑤, the access point 30 may transmit the acquired second identification information and the location information of the electronic device to the server 40.

According to an embodiment, the BT MAC address and the Wi-Fi MAC address of the external electronic device 20 may share the same content (e.g., include a predetermined portion that is identical). Accordingly, the electronic device 10 may compare the Wi-Fi MAC address of the external electronic device 20 acquired by using the first wireless communication module and the BT MAC address acquired by using the second wireless communication module, and identify that the acquired BT MAC address is associated with the external electronic device 20.

For example, the electronic device 10 may identify that the acquired Wi-Fi MAC address that is the first identification information of the external electronic device 20 is 11:11:11:11:11:11. Meanwhile, the BT MAC address that is the second identification information that the electronic device 10 acquired by the second communication method may be 11:11:11:11:11:12. In this case, the electronic device 10 may identify that "11:11:11:11:11" is the same in the Wi-Fi MAC address and the BT MAC address, and identify that the BT MAC address acquired by the second communication method is associated with the external electronic device 20. For example, a method of identifying a Wi-Fi MAC address and a BT MAC address may be set by the manufacturer of the electronic device 10, and may be shared in advance. Accordingly, in case a Wi-Fi MAC address and a BT MAC address are the same with respect to a predetermined portion, are similar, or have a degree of similarity that exceeds a threshold, the electronic device 10 may identify that the Wi-Fi MAC address and the BT MAC address are the MAC addresses for wireless communication of the same device.

According to the an embodiment, the external electronic device 20 may include the strength of a BT signal in the BT signal and transmit the signal to the electronic device 10. If the electronic device 10 acquires a plurality of BT signals, the electronic device 10 may acquire a BT signal of which strength is strong first, and compare the signal with a pre-stored Wi-Fi MAC address.

According to an embodiment, the electronic device 10 may associate the second identification information (e.g., a BT MAC address) with the location information of the electronic device and transmit the information to the location information server 40.

The location information of the electronic device may include, for example, data as provided in Table 1 below.

TABLE 1

|  | X/Y Information | Z Information | Source | Priority |
|---|---|---|---|---|
| Use of geo location information | Road address GPS value | None | Server | 3 |
| Use of a mobile device | Road address GPS value | Air pressure (Unit: meter) | Mobile device | 2 |
| User input | Road address | Floor (Unit: floor) | User input | 1 |

Referring to Table 1, the electronic device 10 may acquire location information by using three sources. For example, the electronic device 10 may acquire geo location information from a server providing location information (e.g., the server of the manufacturer of the operating system of the electronic device, the server of the manufacturer of the electronic device, etc.) and store the information. Geo location information may include, for example, a road address (or a GPS value).

According to an embodiment, the electronic device 10 may acquire location information from a mobile device. For example, the electronic device 10 may acquire a road address (or a GPS value) and a height value based on air pressure information from a mobile device and store the acquired information.

Also, according to an embodiment, the electronic device 10 may store location information that a user inputs. For example, the electronic device 10 may store a road address, the number of floors, etc., based on a user input.

X/Y information (or X/Y coordinate information) may be, for example, values that express a corresponding location on the ground surface as an X value and a Y value, and may correspond to a latitude value and a longitude value. Alternatively, X/Y information may be, for example, information wherein the location of a corresponding point is converted to an address widely used such as a road address.

Z information may be, for example, information indicating the height from one point on the ground surface to a corresponding location. Z information may, for example, express the height from one point on the ground surface to a corresponding location as a distance value, or as the number of floors of a building.

The priority may be, for example, the order of transmitting location information to the location information server 40 by the electronic device 10. Also, the priority may be, for example, the order of accuracy of the location information. For example, geo location information acquired from a server providing location information may be basically acquired, but its accuracy may be lower than location information that a mobile device acquired by using a GPS device or a barometer included in the mobile device. Also, location information that a user directly inputs may be more accurate than location information acquired from a mobile device.

According to an embodiment, the electronic device 10 may transmit only location information having high priorities (e.g., a predetermined priority value or higher) to the location information server 40. It is understood, however, that one or more other embodiments are not limited thereto. For example, the electronic device 10 may transmit all location information to the location information server 40.

A detailed description of the electronic device 10 acquiring location information by the aforementioned method and transmitting the information to the location information server 40 is described below with reference to FIGS. 4 to 6.

The electronic device 10 may have transmitted at least one of the stored location information to the location information server 40 in advance. That is, the location information server 40 may have stored the location information of the electronic device 10 in advance.

According to an embodiment, the location information server 40 may store location information in a form as provided in Table 2.

TABLE 2

| BLE (Header) | BLE MAC (6-Bytes) | Source of X/Y information | Source of X/Y information | Source of Z information | Z information | Information on time/mobile/ telecommunication company | Message Length |
|---|---|---|---|---|---|---|---|

According to an embodiment, the location information server 40 may receive data related to the location information included in Table 1 and store location information in a form (or a format) as exemplified in Table 2.

The BT header may, for example, indicate that information registered in succession with the BT header is information related to BT, as in Table 2.

The BT MAC may be, for example, the BT MAC address of the electronic device 10 or the external electronic device 20 corresponding to location information. The source of X/Y information may mean, for example, a device that generated X/Y information or a device that received input of X/Y information. X/Y information may be, for example, values that express a corresponding location on the ground surface as an X value and a Y value, and may correspond to a latitude value and a longitude value. Alternatively, X/Y information may be, for example, information wherein the location of a corresponding point is converted to an address widely used such as a road address.

The source of Z information may mean, for example, a device that generated Z information or a device that received input of Z information. Z information may be, for example, information indicating the height from one point on the ground surface to a corresponding location. Z information may, for example, express the height from one point on the ground surface to a corresponding location as a distance value, or as the number of floors of a building.

The time may mean, for example, the time that the location information server 40 registered location information. The information on the mobile (e.g., mobile device information) may include, for example, information related to a mobile device corresponding to a BT MAC address (e.g., information on the manufacturer). The information on the telecommunication company may include, for example, information on the telecommunication company providing a communication service for a mobile device corresponding to a BT MAC address.

The message length may mean, for example, the length of the entire data included in the form of the location information data stored in the location information server 40. That is, in order to identify whether data was omitted during a communication process between the electronic device 10 and the location information server 40, the message length may include the entire length of the data transmitted during data transmission.

According to an embodiment, the location information server 40 may record None (0) for an item for which no information exists. Each information may be input in the form of a character string divided by ";". For example, location information may be stored in a form such as "BLE=1; BLEMAC=0x0000f0112233; XYSource=4; lt=+55 0.74297; lg=−4.26880; ZSource=4; al=65; time=201801217175329; IMSI=2141023453647766; IEMI=24 5602402562346; MCC=467; MNC=50; ml=165". However, the form of location information is not limited thereto.

Referring to FIG. 1, the electronic device 10 may have stored "1-1, Seocho 1-dong, Seocho-gu, Seoul" in advance as location information related to the electronic device 10. The electronic device 10 may have associated the BT MAC address of the electronic device 10 with the above address and transmitted the address to the location information server 40.

In this situation, the electronic device 10 may associate the acquired BT MAC address of the external electronic device 20 with the above address and transmit the address to the location information server 40. That is, the electronic device 10 may associate 11:11:11:11:11:12 with "1-1, Seocho 1-dong, Seocho-gu, Seoul" and transmit the address to the location information server 40. Accordingly, the location information server 40 may thereby store the address associated with the external electronic device 20.

According to an embodiment, the electronic device 10 may periodically perform the processes in the operation ② to the operation ③. In case the external electronic device 20 is not connected to the access point 30, or the second identification information of the external electronic device 20 does not exist in the acquired second identification information, the electronic device 10 may request the location information server 40 to delete the pre-stored BT MAC address and location information of the external electronic device 20.

As described above, according to an embodiment, the electronic device 10 may acquire the identification information of the external electronic device 20 and transmit the information to the server 40 together with the location information stored in the electronic device 10. Accordingly, the electronic device 10 may thereby provide convenience such that a user does not have to separately register location information for the external electronic device 20.

Figure 2:
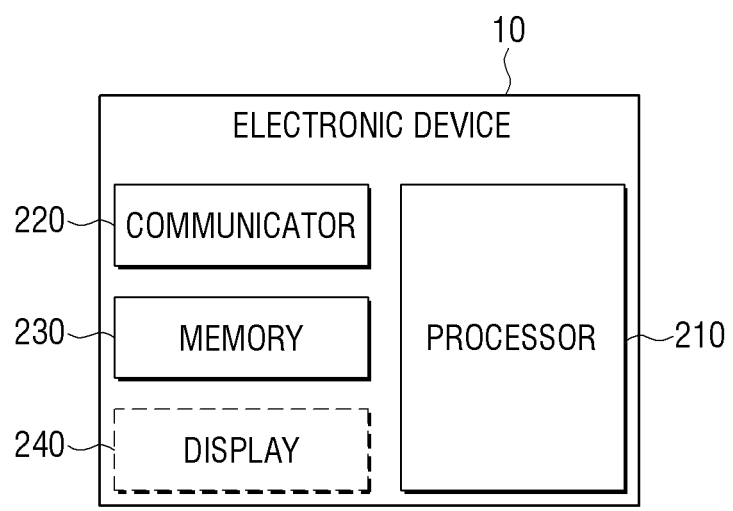
FIG. 2 is a schematic block diagram of an electronic device according to an embodiment.

FIG. 2 is a schematic block diagram of an electronic device 10 according to an embodiment.

Referring to FIG. 2, the electronic device 10 may include a communicator 220, a processor 210, and a memory 230. It is understood, however, that one or more other embodiments are not limited thereto, and the electronic device 10 may further include other components and/or some components may be omitted. For example, the electronic device 10 may further include a display 240.

In the memory 230, one or more of various operating systems (OS) for operating the electronic device 10 may be stored. Also, various kinds of software programs (or applications) for operating or executed by the electronic device 10, and data and instructions for the operations of the electronic device 10 may be stored. At least some of such programs may be downloaded from an external server through wireless or wired communication. The memory 230 may be accessed by the processor 210, and reading/recording/correction/deletion/update, etc., of data by the processor 210 may be performed.

Also, the memory 230 may store instructions that, when executed by the processor 210, cause the processor 210 to control the first wireless communication module to be connected to an access point, to control the first wireless communication module to acquire first identification information for performing wireless communication via the first communication protocol of an external electronic device through the access point, control the second wireless communication module to acquire second identification information for performing wireless communication via the second communication protocol, and according to a result of comparison of the first identification information and the second identification information and based on the second identification information being identified to be associated with the external electronic device, associate the second identification information with the location information of the electronic device and transmit the information to an external server through the first wireless communication module.

In addition, the communicator 220 may include a first wireless communication module performing wireless communication via the first communication protocol, and a second wireless communication module performing wireless communication via the second communication protocol.

Also, the communicator 220 may connect the electronic device 10 to an external device (e.g., a server, another electronic device, etc.) by control of the processor 210. The communicator 220 may include one or more components (e.g., interfaces, circuitry, etc.) implementing various wired and/or wireless communication methods such as wireless LAN, Bluetooth, and wired Ethernet correspondingly to the performance and configuration of the electronic device 10.

The display 240 may display various contents by control of the processor 210. The display 240 may display images, videos, characters and/or execution screens of applications. In case the display 240 is implemented as a touch screen display, the display 240 may be used as an input device as well as an output device.

The processor 210 may control the aforementioned components of the electronic device 10. For example, the processor 210 may control the communicator 220 and transmit and receive data to/from the external electronic device 20 or the server 40 via the communicator 220.

In addition, the processor 210 may copy various kinds of programs, instructions, code, etc., stored in the memory 230 to a RAM, and execute the programs, and thereby perform various kinds of operations. While in the present embodiment, it is described that the processor 210 includes only one processor (e.g., central processing unit (CPU)), it is understood that a plurality of different processors (e.g., a plurality of CPUs, digital signal processors (DSPs), SoCs, etc.) may be implemented.

Further, according to an embodiment, the processor 210 may control the first wireless communication module to connect to an access point, control the first wireless communication module to acquire first identification information for performing wireless communication via the first communication protocol of an external electronic device through the access point, control the second wireless communication module to acquire second identification information for performing wireless communication via the second communication protocol, and according to a result of comparison of the first identification information and the second identification information and based on the second identification information being identified to be associated with the external electronic device, associate the second identification information with the location information of the electronic device and transmit the information to an external server through the first wireless communication module.

Figure 3:
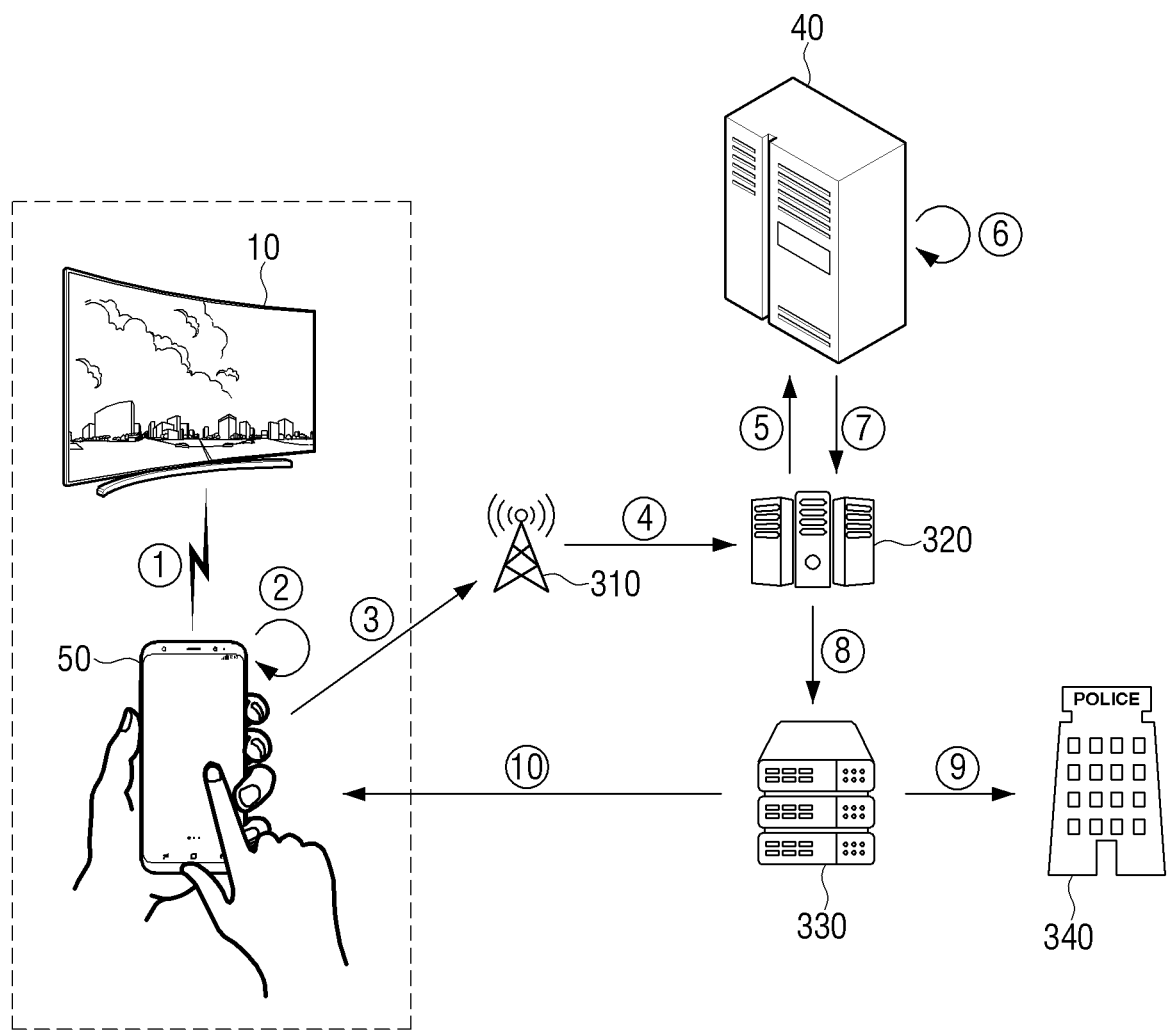
FIG. 3 is a diagram illustrating a situation wherein an electronic device according to an embodiment transmits identification information to a mobile device.

FIG. 3 is a diagram illustrating a situation wherein an electronic device 10 according to an embodiment transmits identification information to a mobile device 50.

Referring to FIG. 3, in operation ①, the electronic device 10 may generate a BT signal including the BT MAC address of the electronic device 10 by a predetermined cycle (e.g., 100 ms to 200 ms), and broadcast the signal.

According to an embodiment, the electronic device 10 may periodically transmit a BT signal even in a state in which the main power is turned off.

In operation ②, the mobile device 50 may acquire (or obtain) a BT signal that is within range around the mobile device 50 in response to (or based on) an occurrence of an event of calling a predetermined number (e.g., an emergency call number).

In operation ③, the mobile device 50 may transmit a BT signal (or BT information) including the BT MAC address of the electronic device 10 acquired (or obtained) from the electronic device 10 to a base station 310 of a telecommunication company. For example, by using a third wireless communication module (e.g., a cellular communication module), the mobile device 50 may transmit the BT MAC address of the electronic device 10 to the base station 310 of the telecommunication company simultaneously or sequentially with the process of connecting to an emergency rescue server 330 through the emergency call number.

In operation ④, the base station 310 of the telecommunication company may transmit the BT signal including the acquired BT MAC address of the electronic device 10 to a server 320 of the telecommunication company.

In operation ⑤, the server 320 of the telecommunication company may transmit, to the location information server 40, the BT signal including the BT MAC address of the electronic device 10 acquired (or obtained) by using the emergency call number.

In operation ⑥, the location information server 40 may acquire (or obtain) the BT MAC address included in the electronic device 10 from the acquired BT signal. The location information server 40 may compare the acquired BT MAC address of the electronic device 10 with a pre-stored data table (e.g., a data table in which the aforementioned BT MAC address and location information as provided in Table 2 are stored in a corresponding way), and identify location information corresponding to the acquired BT MAC address.

In operation ⑦, the location information server 40 may transmit the identified location information to the server 320 of the telecommunication company.

In operation ⑧, the server 320 of the telecommunication company may transmit the acquired location information to the emergency rescue server 330.

In operation ⑨, the emergency rescue server 330 may transmit the acquired location information to an emergency rescue dispatch center 340 (e.g., the police, the fire station, etc.). Accordingly, the emergency rescue dispatch center 340 may identify the accurate location information of the place at which the mobile device 50 that requested an emergency call is located.

According to an embodiment, the mobile device 50 may acquire a plurality of BT signals. For example, the mobile device 50 may acquire BT signals generated at the electronic device 10, and BT signals generated at the external electronic device 20. The mobile device 50 may transmit all of the acquired BT signals to the server 320 of the telecommunication company.

Also, according to an embodiment, the location information server 40 may acquire a plurality of BT signals from the server 320 of the telecommunication company. In this case, the location information server 40 may transmit location information corresponding to the BT MAC address included in the BT signal of which strength is the strongest to the server 320 of the telecommunication company.

In addition, according to an embodiment, the location information server 40 may identify location information corresponding to BT MAC addresses included in a plurality of BT signals, and determine location information to be transmitted to the server 320 of the telecommunication company. For example, if the first location information corresponding to the first BT MAC address and the second location information corresponding to the second BT MAC address are the same, and the third location information corresponding to the third BT MAC address is different, the location information server 40 may transmit the first location information or the second location information to the server 320 of the telecommunication company.

As described above, according to an embodiment, the electronic device 10 may transmit pre-stored identification information to the mobile device 50 in response to an emergency rescue call generated at the mobile device 50, and thereby provide convenience such that the counterpart receiving the emergency rescue call from the mobile device 50 can acquire the location of the mobile device 50 more accurately.

Figure 4:
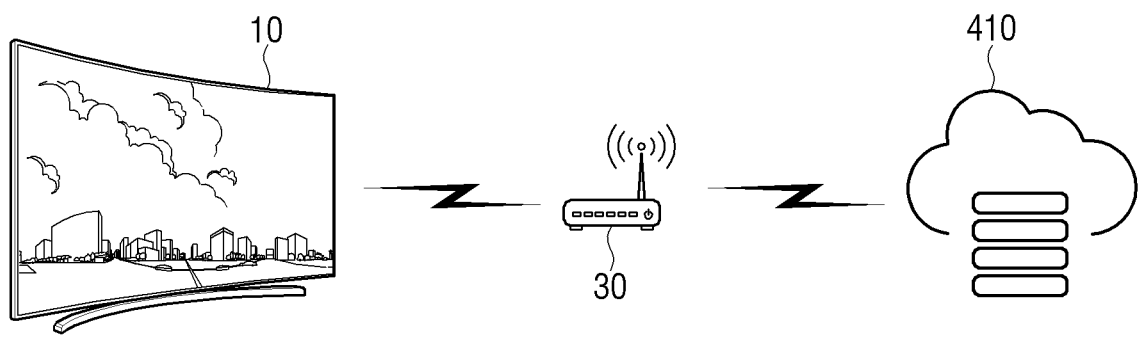
FIG. 4 is a diagram illustrating a situation wherein an electronic device according to an embodiment acquires location information from a server providing location information.

FIG. 4 is a diagram illustrating a situation wherein an electronic device 10 according to an embodiment acquires location information from a server providing location information.

Referring to FIG. 4, the electronic device 10 may be assigned an IP address from a company providing the Internet network service (e.g., an Internet Service Provider).

The electronic device 10 may acquire or obtain an IP address by using the access point 30 provided by the company providing the Internet network service, and access the Internet network by using the access point 30. For example, the electronic device 10 may access the Internet network by establishing communication with the access point 30 by using a Wi-Fi communication module. Alternatively, the electronic device 10 may access the Internet network by establishing communication with the access point 30 by using a LAN communication module or another type of wired or wireless communication module and method.

The electronic device 10 may establish communication with a server 410 by using the acquired IP address. For example, the electronic device 10 may establish communication with a server 410 provided, maintained, or controlled by the manufacturer of the electronic device 10. Alternatively, the electronic device 10 may establish communication with a server 410 provided, maintained, or controlled by the manufacturer of the operating system operating the electronic device 10. It is understood, however, that the disclosure is not limited thereto.

In addition, the electronic device 10 may acquire geo location information by using the acquired IP address and the server 410. For example, the electronic device 10 may acquire location information corresponding to the acquired IP address from the server 410.

Further, the electronic device 10 may acquire location information in the form of a GPS value. The electronic device 10 may convert the acquired location information in the form of a GPS value to the form of an address (e.g., a road address) and transmit the address to the location information server 40, although it is understood that one or more other embodiments are not limited thereto. For example, the location information server 40 may acquire location information in the form of a GPS value from the electronic device 10. The location information server 40 may convert the acquired location information in the form of a GPS value to the form of an address.

Also, the location information server 40 may store location information acquired (or obtained) from the electronic device 10. For example, the location information server 40 may store the acquired location information as X/Y information.

The electronic device 10 may not acquire Z information in the geo location information acquired based on an IP address. In this case, the location information server 40 may store Z information and the source of Z information as not existing (e.g., none (0)).

Figure 5:
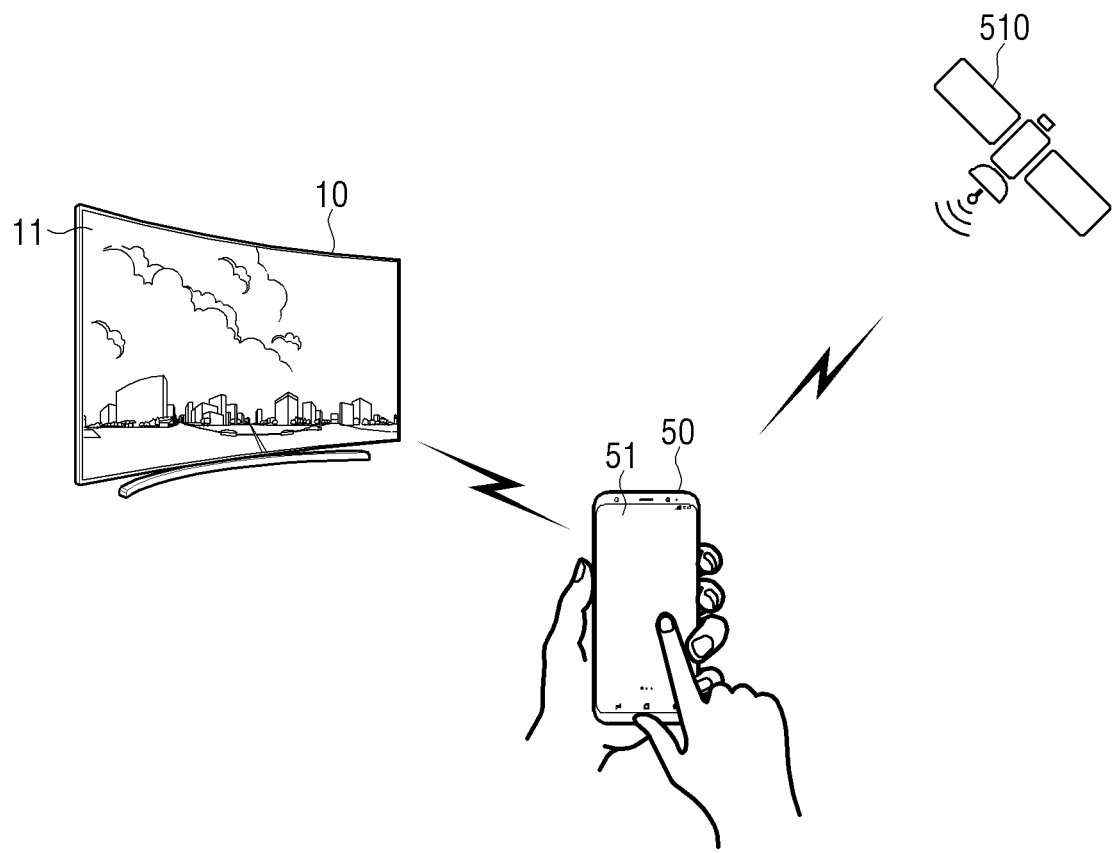
FIG. 5 is a diagram illustrating a situation wherein an electronic device according to an embodiment acquires location information by using a mobile device.

FIG. 5 is a diagram illustrating a situation wherein an electronic device 10 according to an embodiment acquires (or obtains) location information by using a mobile device 50.

The electronic device 10 may transmit and receive data with a mobile device 50 located nearby and determine the setting value of the electronic device 10. For example, the electronic device 10 may transmit and receive data to/from the mobile device 50 by using a near field or short range wireless communication method (e.g., Bluetooth communication, near field communication (NFC) communication, Wi-Fi direct communication, etc.).

The electronic device 10 may, for example, acquire Wi-Fi setting information that the mobile device 50 acquired by accessing the access point 30. Alternatively, the electronic device 10 may acquire log-in information of the web site that the mobile device 50 stores. Accordingly, a user may access a web site that the user had accessed by using the mobile device 50 through the electronic device 10, without a separate registration process.

The mobile device 50 may change the setting value of the electronic device 10 by using an application installed on the mobile device 50. For example, the mobile device 50 may display a user interface for an application adjusting the setting value of the electronic device 10 on the display 51. A user may adjust the brightness value and the color value of the display 11 of the electronic device 10 by using the user interface displayed on the display 51 of the mobile device 50.

The electronic device 10 may transmit and receive data to/from the mobile device 50 and acquire GPS information or address information that the mobile device 50 stores. The electronic device 10 may acquire X/Y information among the location information by using the GPS information or the address information that the mobile device 50 acquired from a satellite 510.

According to the various embodiments of the disclosure, the electronic device 10 may transmit and receive data with the mobile device 50 and acquire the air pressure information (e.g., the air pressure value) that the mobile device 50 stores. The electronic device 10 may acquire Z information among the location information by using the air pressure information that the mobile device 50 acquired by using an air pressure sensor.

The accuracy of the location information that the electronic device 10 acquired by using the mobile device 50 may be higher than that of the location information that the electronic device 10 acquired based on an IP address. The electronic device 10 may set the priority of the location information acquired by using the mobile device 50 to be higher than the priority of the location information acquired based on an IP address.

The electronic device 10 may acquire only one of GPS information (or, address information) and air pressure information from the mobile device 50, or may not acquire either of them.

For example, the electronic device 10 may not acquire GPS information (or, address information) from the mobile device 50, but may acquire air pressure information. The electronic device 10 may convert the air pressure information (e.g., the air pressure value) to a distance value (e.g., a meter value) and transmit the value to the location information server 40. Alternatively, the location information server 40 may convert the air pressure information acquired from the electronic device 10 to a distance value and store the value as Z information.

If the electronic device 10 does not acquire GPS information (or address information) from the mobile device 50, the electronic device 10 may transmit the X/Y information acquired by using the aforementioned IP address in FIG. 4 to the location information server 40.

The location information server 40 may register location information while setting the source of X/Y information as a server, and the source of Z information as a mobile device.

The electronic device 10 may acquire GPS information (or address information) from the mobile device 50, and may not acquire air pressure information. The electronic device 10 may transmit the acquired GPS information (or address information) to the location information server 40. The location information server 40 may store the GPS information (or address information) acquired from the electronic device 10 as X/Y information, and store the source of the X/Y information as the mobile device 50.

If the location information server 40 does not acquire air pressure information from the electronic device 10, the location information server 40 may store Z information and the source of Z information as not existing (e.g., none (0)).

Also, the electronic device 10 may not acquire GPS information (or address information) and air pressure information from the mobile device 50. In this case, the location information server 40 may use the location information acquired by the method described above with reference to FIG. 4.

Figure 6:
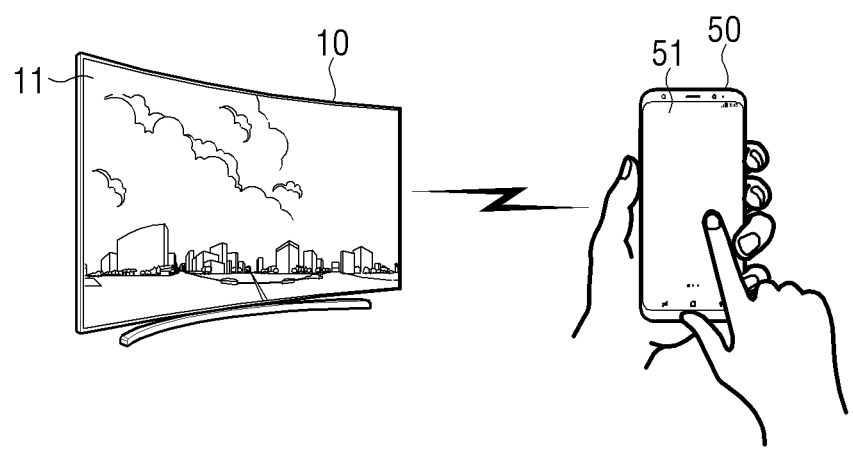
FIG. 6 is a diagram illustrating a situation wherein an electronic device according to an embodiment acquires location information through a user input.

FIG. 6 is a diagram illustrating a situation wherein an electronic device 10 according to an embodiment acquires location information through a user input.

According to an embodiment, the electronic device 10 may store an address input by a user as location information.

For example, the electronic device 10 may transmit and receive data with the mobile device 50 located nearby and determine the setting value of the electronic device 10. For example, the electronic device 10 may transmit and receive data with the mobile device 50 by using a near field or short-range wireless communication method (e.g., Bluetooth communication, near field communication (NFC) communication, Wi-Fi direct communication, etc.).

The mobile device 50 may display, on the display 51, a user interface that can receive input of an address to be transmitted to the electronic device 10. For example, if an application providing a function of inputting an address to the electronic device 10 is executed, the mobile device 50 may display the user interface.

Alternatively, for example, if the electronic device 10 is installed first and establishes communication with the server of the manufacturer, and establishes communication with the mobile device 50, the electronic device 10 may transmit data corresponding to the user interface to the mobile device 50. The mobile device 50 may display the user interface on the display 51 based on the acquired or received data.

The mobile device 50 may transmit the address input through the user interface to the electronic device 10. For example, the mobile device 50 may transmit, to the electronic device 10, address information input by a user as "501-ho, K Building, Seocho-daero 1-gil, Seocho-gu, Seoul."

The electronic device 10 may display a user interface that can receive input of an address to be transmitted to the location information server 40 on the display 11.

Also, the electronic device 10 may provide a voice or audio guide that guides a user to input an address to be transmitted to the location information server 40. The electronic device 10 may acquire the address input in response to the voice guide as address information to be transmitted to the location information server 40 and store the address.

In addition, a user may control various operations of the electronic device 10 by using a remote controller. For example, a user may execute a function of inputting address information by using a remote controller, and input address information to be transmitted to the location information server 40.

Then, the electronic device 10 may identify "Seocho-daero 1-gil, Seocho-gu, Seoul" as X/Y information, and identify "501-ho, K Building" as Z information based on the acquired address information, and transmit the information to the location information server 40.

According to an embodiment, the accuracy of the location information that the electronic device 10 acquired in response to a user input may be higher than that of the location information acquired through other routes or methods. The electronic device 10 may set the priority of the location information acquired in response to a user input to be higher than the priority of the location information acquired through other routes or methods.

Also, the electronic device 10 may associate only one information among the location information acquired in FIGS. 4 to 6 with the MAC address information of the electronic device 10 and transmit the information to the location information server 40. For example, the electronic device 10 may transmit the location information having the highest priority to the location information server 40. It is understood, however, that one or more embodiments are not limited thereto. For example, the electronic device 10 may associate all of the acquired location information with the MAC address information of the electronic device 10 and transmit the information to the location information server 40.

In addition, according to an embodiment, the electronic device 10 may periodically change the BT MAC address. In this case, when the BT MAC address is changed, the electronic device 10 may transmit the BT MAC address to the location information server 40. The location information server 40 may acquire the BT MAC address of the electronic device 10 periodically acquired and update the pre-stored location information.

Figure 7:
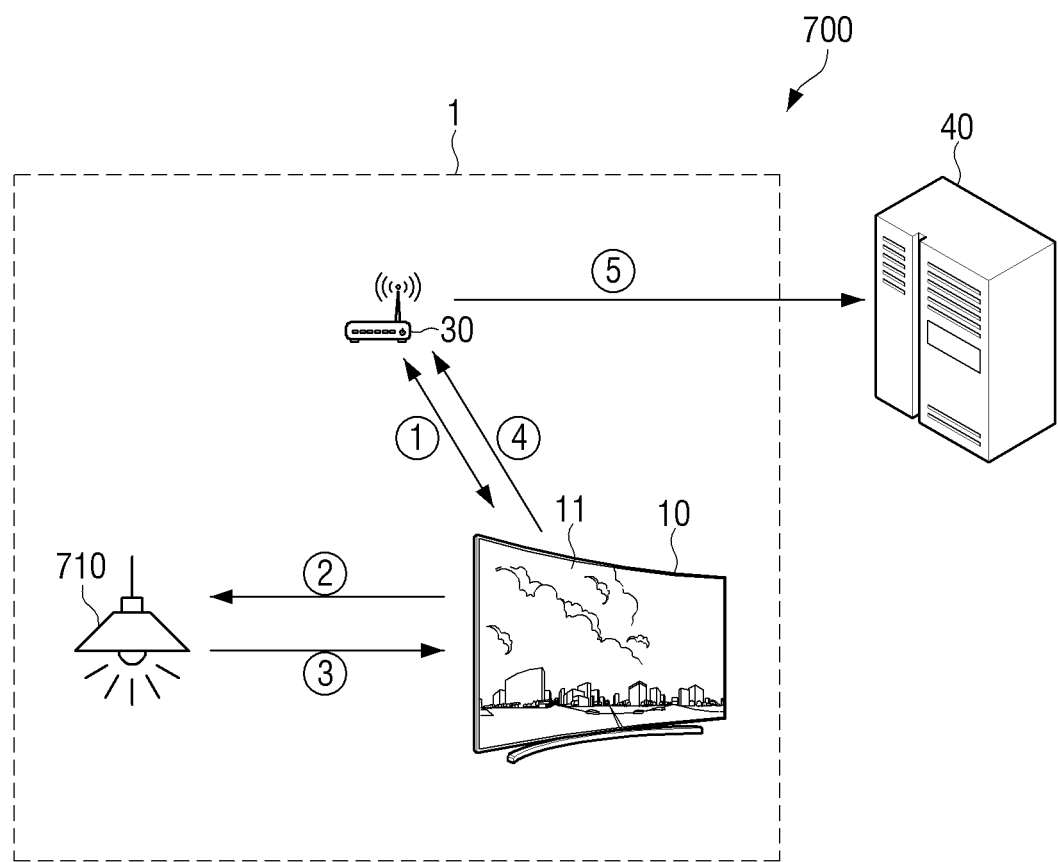
FIG. 7 is a diagram illustrating a situation wherein an electronic device according to an embodiment transmits identification information acquired by using another system acquiring identification information of another electronic device to a server.

FIG. 7 is a diagram illustrating a situation wherein an electronic device 10 according to an embodiment transmits, to a server 40, identification information acquired by using another system 700 acquiring identification information of another electronic device 710.

Referring to FIG. 7, the system 700 may include an electronic device 10, an external electronic device 710, an access point 30, and a location information server 40.

The electronic device 10, the external electronic device 710, and the access point 30 may be located to be adjacent to one another in an area within a specific range, e.g., indoor 1.

The electronic device 10 may be a TV, but this is merely an example, and the electronic device 10 may be implemented in various forms including displays 11. Also, the electronic device 10 may establish communication with the access point 30 by using the first wireless communication method (e.g., a Wi-Fi communication method).

Also, the location information server 40 may establish communication with the electronic device 10 by using the access point 30, and transmit and receive location information data.

In addition, the external electronic device 710 may be an electric light, but is not limited thereto. The external electronic device 710 may establish communication with the electronic device 10 by using the second wireless communication method (e.g., a BT communication method).

Hereinafter, a situation wherein the electronic device 10 acquires identification information of the external electronic device 710 and transmits the information to the location information server 40 by using the system 700 is described.

In operation ①, the electronic device 10 may be connected to the access point 30 by using the first wireless communication method. For example, the electronic device 10 may establish communication with the access point 30 by using a Wi-Fi communication method.

In operation ②, the electronic device 10 may identify a device using the second wireless communication method by using the second wireless communication method. For example, the electronic device 10 may broadcast a BT signal (such as a discovery signal) to its surroundings.

In operation ③, the external electronic device 710 may acquire a BT signal and transmit a BT signal or information corresponding thereto to the electronic device 10.

In a situation wherein the electronic device 10 and the external electronic device 710 transmit and receive a BT signal with each other, if occurrence of an event identifying data transmission and reception through a BT signal is detected, the second identification information (e.g., a BT MAC address) may be transmitted and received. An event identifying data transmission and reception through a BT signal may mean, for example, that the electronic device 10 and the external electronic device 710 respectively acquire a key input or a touch input authenticating data communication from a user.

The electronic device 10 may acquire BT signals from a plurality of electronic devices in the process of operation ③. In this case, the electronic device 10 may perform the aforementioned process with the plurality of electronic devices and form a network using a BT communication method with the plurality of electronic devices.

In operations ④ and ⑤, the electronic device 10 may associate the second identification information with pre-stored location information and transmit the information to the location information server 40. The location information may include the aforementioned data in Table 1.

For example, the electronic device 10 may have stored "898, Maetan 1-dong, Suwon-si, Gyeonggi-do" as location information related to the electronic device 10. The electronic device 10 may have associated the BT MAC address of the electronic device 10 with the above address and transmitted the address to the location information server 40. In this situation, the electronic device 10 may associate the acquired BT MAC address of the external electronic device 710 with the above address and transmit the address to the location information server 40.

As described above, according to an embodiment, the electronic device 10 may acquire identification information of other electronic devices located nearby and transmit the information to the location information server 40 together with the pre-stored location information. Accordingly, even if a user makes an emergency rescue call while being adjacent to another electronic device of which address is not registered, the emergency rescue center may be provided with the accurate location information of the user from the location information server 40.

Figure 8:
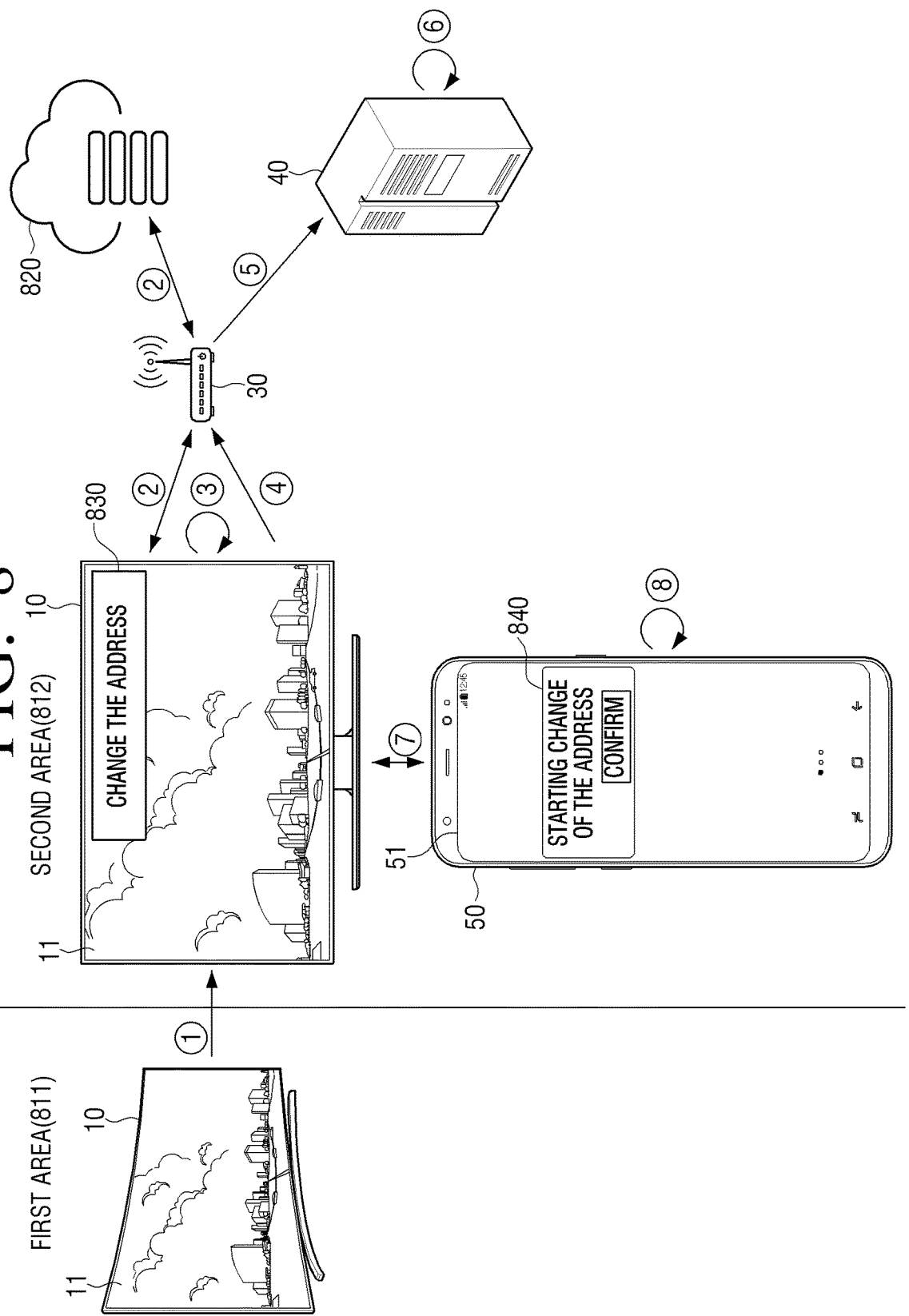
FIG. 8 is a diagram illustrating a situation wherein an electronic device according to an embodiment changes location information.

FIG. 8 is a diagram illustrating a situation wherein an electronic device according to an embodiment changes location information.

Referring to FIG. 8, the electronic device 10 may have stored location information in the first area 811.

For example, the electronic device 10 may establish communication with the server operated by the manufacturer of the electronic device 10 in the first area 811. The electronic device 10 may acquire geo location information by using the server operated by the manufacturer and store the information. The electronic device 10 may have stored, for example, "1-1, Seocho 1-dong, Seocho-gu, Seoul."

The electronic device 10 may transmit and receive data with a mobile device located nearby and acquire GPS information (or address information), and/or air pressure information that the mobile device stores. For example, the electronic device 10 may acquire GPS information that the mobile device stores, and acquire address information as "A Building, 1-1, Seocho 1-dong, Seocho-gu, Seoul." Alternatively, the electronic device 10 may acquire air pressure information that the mobile device stores and acquire height information as "5m."

Also, the electronic device 10 may store an address input by a user as location information. For example, if the electronic device 10 is installed first and establishes communication with the server of the manufacturer, the electronic device 10 may display a user interface that can input location information on the display 11. The electronic device 10 may acquire address information as "701-ho, A Building, 1-1, Seocho 1-dong, Seocho-gu, Seoul" according to a user input.

It is understood, however, that one or more other embodiments are not limited thereto. For example, according to another embodiment, the electronic device 10 may display the user interface on the display 11 in response to occurrence of an event wherein a function related to input of an address is executed.

In operation ①, the location of the electronic device 10 is moved from the first area 811 to the second area 812.

In operation ②, the electronic device 10 may acquire an IP address by using the access point 30 provided by the company providing the Internet network service in the second area 812, and access the Internet network by using the access point 30.

The electronic device 10 may establish communication with the server 820 operated by the manufacturer by using a newly acquired IP address. The electronic device 10 may acquire geo location information by using the newly acquired IP address and the server 820. For example, the electronic device 10 may acquire address information as "898, Maetan 1-dong, Suwon-si, Gyeonggi-do."

In operation ③, the electronic device 10 may delete all of the pre-stored location information, and store an address acquired based on the new IP address.

The electronic device 10 may output a notification requesting correction of location information. A notification requesting correction of location information may, for example, display a notification 830 including a content regarding correction of location information on the display 11.

The electronic device 10 may output a sound requesting correction of location information (e.g., a voice, or a pre-determined sound).

In operation ④, the electronic device 10 may transmit a signal requesting deletion of location information stored in association with the MAC address of the electronic device 10 in the location information server 40 to the access point 30. Also, the electronic device 10 may transmit a signal requesting to store newly acquired location information in association with the MAC address of the electronic device in the location information server 40 to the access point 30.

In operation ⑤, the access point 30 may transmit the signal acquired from the electronic device 10 to the location management server 40.

In operation ⑥, the location information server 40 may delete the previous location information associated with the MAC address of the electronic device 10 based on the signal acquired from the access point 30, and store the newly acquired location information.

In operation ⑦, the electronic device 10 may identify the mobile device 50 in an adjacent location by using a near field or short-range communication method (e.g., BT communication, ultrasonic communication, etc.). With respect to the identified mobile device 50, the electronic device 10 may transmit a signal requesting approval for acquiring location information data from the mobile device 50.

In operation ⑧, the mobile device 50 may display a notification 840 corresponding to the acquired signal on the display 51. When an approving signal is generated in response to the notification 840, the mobile device 50 may transmit location information to the electronic device 10. The electronic device 10 may acquire location information by using the aforementioned process in FIG. 5.

According to an embodiment, the electronic device 10 may display a user interface that can receive an input of an address on the display 11 for receiving a user input as described above with reference to FIG. 6. The electronic device 10 may store location information input through the user interface, and transmit the information to the server 40.

Alternatively, the electronic device 10 may request the mobile device 50 to display a user interface for input of an address. The mobile device 50 may transmit location information input through the user interface to the electronic device 10.

Figure 9:
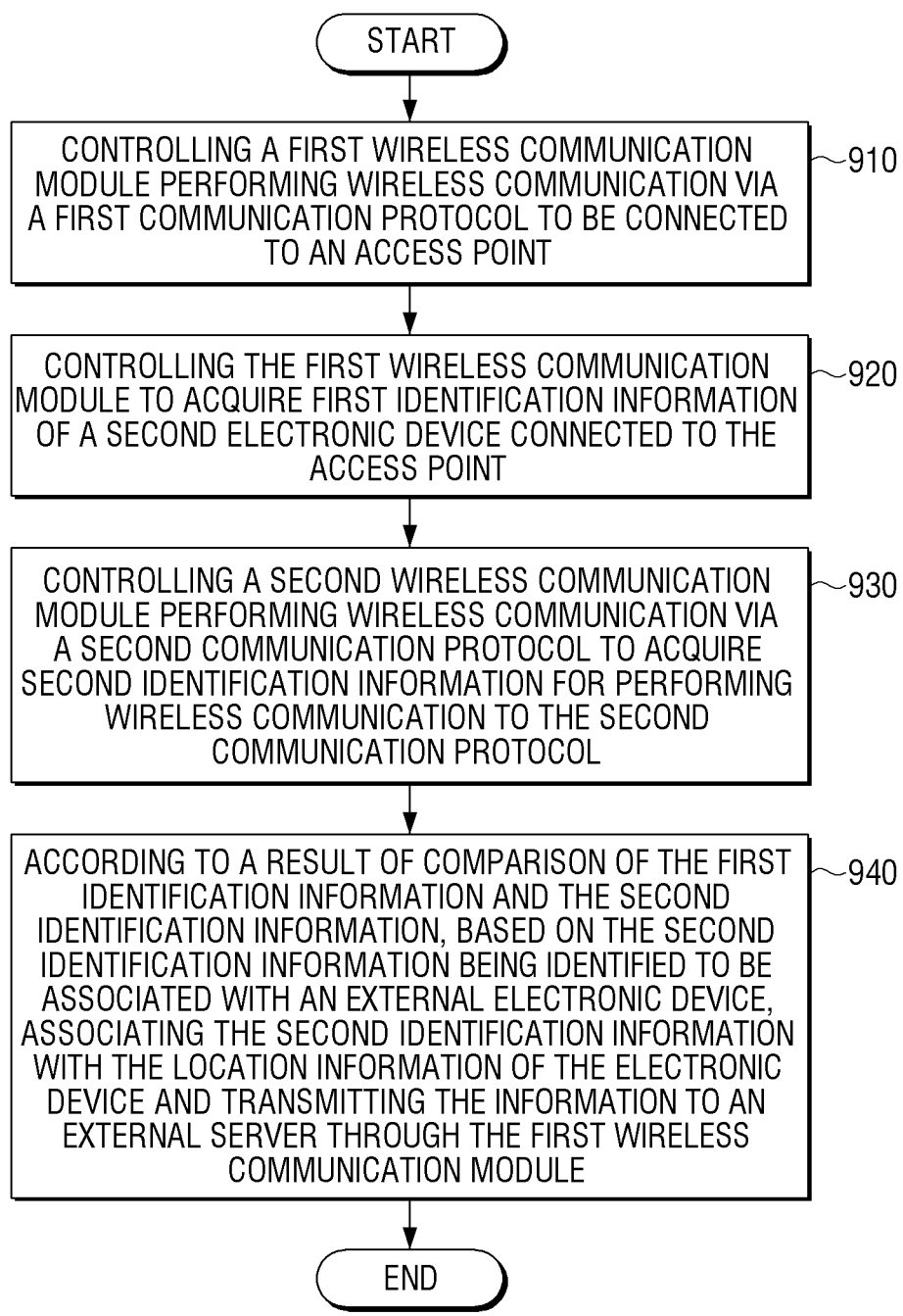
FIG. 9 is a flowchart illustrating a situation wherein an electronic device according to an embodiment acquires identification information of an external electronic device and transmits the information to a server.

FIG. 9 is a flowchart illustrating a situation wherein an electronic device 10 according to an embodiment acquires identification information of an external electronic device and transmits the information to a server.

Referring to FIG. 9, in operation 910, the electronic device 10 may control the first wireless communication module performing wireless communication via the first communication protocol to be connected to the access point. For example, the electronic device 10 may be connected to the access point by using a Wi-Fi communication module.

In operation 920, the electronic device 10 may control the first wireless communication module to acquire the first identification information of the external electronic device (e.g., the external electronic device 20 in FIG. 1) connected to the access point.

The electronic device 10 may acquire the first identification information (e.g., a Wi-Fi MAC address) of the external electronic device by utilizing an address resolution protocol (ARP). An ARP may be a protocol used to correspond an Internet Protocol (IP) address to the physical address (e.g., a Wi-Fi MAC address) of a device connected to a Wi-Fi network on a local area network (LAN) based on the IEEE 802 standard.

The electronic device 10 may acquire the IP address of the external electronic device connected to an access point from the access point (e.g., the access point 30 in FIG. 1). The electronic device 10 may include the Wi-Fi MAC address of the electronic device 10, the IP address of the electronic device 10, and the IP address of the external electronic device acquired from the access point, and transmit, to the access point, a request signal requesting to receive a Wi-Fi MAC address with respect to the external electronic device connected to the access point.

The access point may transmit the acquired request signal to the external electronic device connected to the access point.

If (or based on) the external electronic device identifies that the IP address included in the received request signal and the IP address of the external electronic device are the same, the external electronic device may transmit the response signal including the Wi-Fi MAC address of the external electronic device to the access point. The access point may transmit the acquired response signal to the electronic device 10.

In operation 930, the electronic device 10 may control the second wireless communication module performing wireless communication via the second communication protocol to acquire second identification information for performing wireless communication to the second communication protocol.

For example, the electronic device 10 may acquire a BT signal that can be acquired around the electronic device 10 by using a BT communication method, and acquire the second identification information included in the acquired BT signal. The second identification information may be, for example, a BT MAC address. A BT MAC address is a unique numbers corresponding to a device and used for a BT network, and it may be set by the manufacturer of a device when the device is manufactured.

In operation 940, according to a result of a comparison of the first identification information and the second identification information, based on the second identification information being identified to be associated with the external electronic device, the electronic device 10 may associate the second identification information with the location information of the electronic device and transmit the information to an external server through the first wireless communication module.

For example, at least a part of the BT MAC address and at least a part of the Wi-Fi MAC address of the external electronic device 20 may share the same content. Accordingly, the electronic device 10 may compare the Wi-Fi MAC address of the external electronic device 20 acquired by the first communication method and the BT MAC address acquired by the second communication method and identify that the acquired BT MAC address is associated with the external electronic device 20.

If the electronic device 10 determines that the BT MAC address is associated with the external electronic device 20, the electronic device 10 may associate the BT MAC address of the external electronic device with the location information of the electronic device 10 that it stores and transmit the information to an external server.

Figure 10:
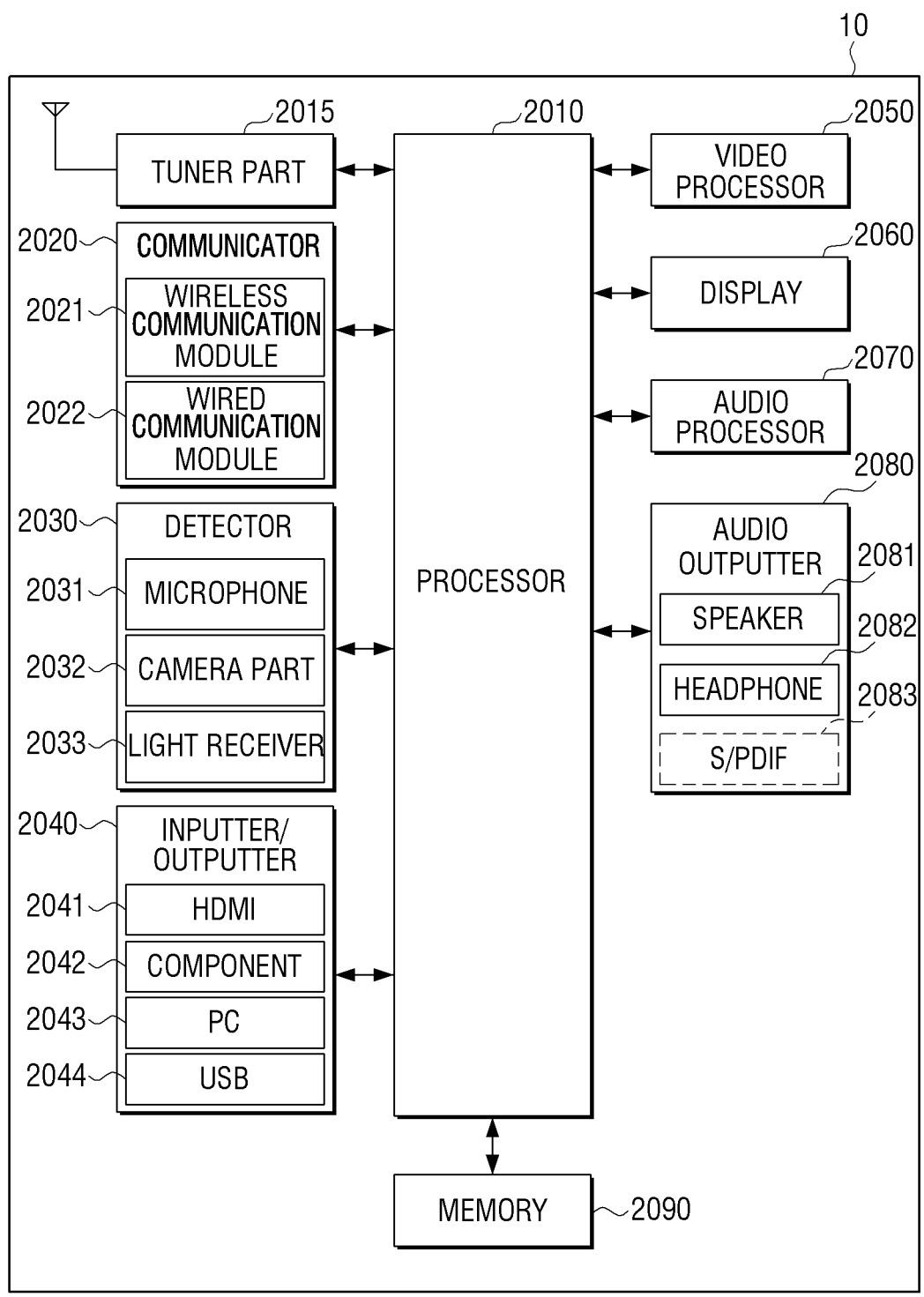
FIG. 10 is a block diagram of an electronic device according to an embodiment.

FIG. 10 is a block diagram of an electronic device 10 according to an embodiment.

As illustrated in FIG. 10, the electronic device 10 may include at least one of a tuner part 2015 (e.g., tuner), a detector 2030, an inputter/outputter 340, a video processor 2050, an audio processor 2070, and an audio outputter 2080, in addition to a processor 2010 (e.g., at least one processor), a communicator 2020 (e.g., communication interface, communication circuitry, etc.), a memory 230, and a display 240.

The processor 2010 may, for example, execute software (e.g., a program) stored in the memory 2090 and control at least one other component (e.g., a hardware or software component) of the electronic device 10 connected to the processor 2010, and perform various kinds of data processing or operations. The processor 2010 may correspond to the processor 210 in FIG. 2. According As at least a part of data processing or operation, the processor 2010 may load an instruction or data received from another component in a memory (e.g., a volatile memory) 2090, process the instruction or data stored in the memory 2090, and store the result data in a memory (e.g., a non-volatile memory). The processor 2010 may include a main processor (e.g., a central processing device, an application processor, etc.), and a subsidiary processor that can be operated independently therefrom or can be operated together (e.g., a graphic processing device, an image signal processor, a sensor hub processor, a communication processor, etc.).

Additionally or generally, a subsidiary processor may be set such that it uses lower power than the main processor, or is specialized for a designated function. A subsidiary processor may be implemented separately from the main processor, or as a part thereof. A subsidiary processor may, for example, control at least some of the functions or states related to at least one component among the components of the electronic device 10 instead of the main processor while the main processor is in an inactive (e.g., sleep) state, or together with the main processor while the main processor is in an active (e.g., executing an application) state.

The communicator 2020 may connect the electronic device 10 with the external device 20 and the server 40 by control of the processor 2010. The communicator 2020 may correspond to the communicator 220 in FIG. 2. The communicator 2020 may include at least one communication processor that is operated independently from the processor 2010 (e.g., an application processor), and supports direct (e.g., wired) communication or wireless communication. The communicator 2020 may include a wireless communication module 2021 (e.g., a cellular communication module, a near field wireless communication module, a global navigation satellite system (GNSS) communication module, etc.) and/or a wired communication module 2020 (e.g., a local area network (LAN) communication module, a power line communication module, etc.). A corresponding communication module among these communication modules may communicate with the server 40 through the first network (e.g., a near field communication network such as Bluetooth, Wi-Fi direct, infrared data association (IrDA), etc.) or the second network (e.g., a telecommunication network such as a cellular network, the Internet, a computer network (e.g., a LAN or a WAN), etc.). Such several kinds of communication modules may be integrated as one component (e.g., a single chip), or may be implemented as a plurality of separate components (e.g., a plurality of chips).

The display 2060 may visually provide information (e.g., a UI, etc.) to the outside (e.g., a user) of the electronic device 10. The display 2060 may correspond to the display 240 in FIG. 2. In case the display 2060 and a touch pad constitute a layer structure and are constituted as a touch screen, the display 2060 may be used as an input device as well as an output device. The display 2060 may include at least one among a liquid crystal display, a thin film transistor-liquid crystal display, an organic light-emitting diode, a flexible display, a three-dimensional (3D) display, an electrophoretic display, etc. Also, depending on implementation forms of the electronic device 10, the electronic device 10 may include two or more displays 2060.

The tuner part 2015 may select a broadcasting signal received via wire or wirelessly by tuning only the frequency of the channel that is to be received by the electronic device 10 among numerous radio wave components through amplification, mixing, resonance, etc. A broadcasting signal includes audio, video, and additional information (e.g., an electronic program guide (EPG)).

A broadcasting signal received through the tuner part 2015 is decoded (e.g., at least one of audio decoding, video decoding, or additional information decoding), and is divided into audio, video and/or additional information. The divided audio, video and/or additional information may be stored in the memory 2090 by control of the processor 2010. The tuner part 2015 of the electronic device 10 may be one or in a plural number. The tuner part 2015 may be implemented as an all-in-one type with the electronic device 10 or may be implemented as a separate device having a tuner part electronically connected with the electronic device 10, and a tuner part connected with the inputter/outputter 2040.

The detector 2030 detects at least one of a voice of a user, an image of a user, or an interaction of a user, and may include a microphone 2031, a camera part 2032, and a light receiver 2033.

The microphone 2031 receives a voice uttered by a user. The microphone 2031 may convert the received voice into an electronic signal and output the voice to the processor 2010. The camera part 2032 may receive an image (e.g., continuous frames) corresponding to a user's motion including a gesture in the recognition range of the camera. The light receiver 2033 receives a light signal (including a control signal) received from an external control device (e.g., a remote control). The light receiver 2033 may receive a light signal corresponding to a user input (e.g., at least one of a touch, a push, a touch gesture, a voice, or a motion) from the control device. A control signal may be extracted from the received light signal by control of the processor 2010.

The inputter/outputter 2040 receives video (e.g., a moving image, etc.), audio (e.g., a voice, music, etc.), additional information (e.g., an EPG, etc.), and the like from the outside of the electronic device 10 by control of the processor 2010. The inputter/outputter 2040 may include at least one among a high-definition multimedia interface (HDMI) port 2041, a component jack 2042, a PC port 2043, and a USB port 2044. The inputter/outputter 2040 may include a combination of an HDMI port 2041, a component jack 2042, a PC port 2043, and a USB port 2044.

The video processor 2050 may process an image to be displayed by the display 2060, and may perform various kinds of image processing such as at least one of decoding, scaling, noise filtering, frame rate conversion, resolution conversion, etc., for video data.

The audio processor 2070 performs processing for audio data. At the audio processor 2070, various kinds of processing such as at least one of decoding or amplification, noise filtering, etc., for audio data may be performed.

The audio outputter 2080 may output audio included in a broadcasting signal received through the tuner part 2015, audio input through the communicator 2020 or the inputter/outputter 2040, and audio stored in the memory 2090 by control of the processor 2010. The audio outputter 2080 may include at least one of a speaker 2081, a headphone output terminal 2082, or a Sony/Philips digital interface (S/PDIF: an output terminal) 2083.

The memory 2090 may store a program for processing and control of the processor 2010, and may store data input to the electronic device 10 or output from the electronic device 10.

The memory 2090 may include at least one type of storage medium among a memory of a flash memory type, a hard disk type, a multimedia card micro type, a card type (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. The memory 2090 may correspond to the memory 230 in FIG. 2.

An electronic device and a method of controlling thereof according to one or more embodiments may acquire identification information of another electronic device and correspond the information to pre-stored location information and transmit the information to the server supporting an emergency rescue service.

Also, an electronic device and a method of controlling thereof according to one or more embodiments may acquire location information by using an Internet network.

In addition, an electronic device and a method of controlling thereof according to one or more embodiments may be interlocked with a mobile device and acquire location information.

Further, an electronic device and a method of controlling thereof according to one or more embodiments may acquire location information based on a user's input.

Various embodiments of the disclosure may be implemented as software (e.g., a program) including at least one instruction stored in a storage medium (e.g., the memory 2090) that is readable by machines (e.g., the electronic device 10 or the external electronic device 20). For example, a machine (e.g., a processor such as the processor 2010 of the electronic device 10) may call at least one instruction among at least one instruction stored in a storage medium, and execute the instruction. This enables a device to be operated to perform at least one function according to the at least one instruction called. The at least one instruction may include a code that is generated by a compiler or a code that can be executed by an interpreter. A storage medium that is readable by machines may be stored in the form of a non-transitory storage medium. Here, the term "non-transitory" only means that a storage medium is a tangible device, and does not include a signal (e.g., an electromagnetic wave), and the term does not indicate whether data is stored in the storage medium semi-permanently or temporarily.

Also, a method according to one or more embodiments may be provided while being included in a computer program product. A computer program product refers to a product, and can be traded between a seller and a buyer. A computer program product can be distributed in the form of a storage medium that is readable by machines (e.g., a compact disc read only memory (CD-ROM)), or may be distributed online (e.g., download or upload) through an application store (e.g., PLAY STORE™) or directly between two user devices (e.g., smartphones). In the case of online distribution, at least a portion of a computer program product may be stored in a storage medium such as the server of the manufacturer, the server of the application store, and the memory of the relay server at least temporarily, or may be generated temporarily.

In addition, according to various embodiments, each of the aforementioned components (e.g., a module or a program) may include a singular object or a plurality of objects. Also, according to various embodiments, among the aforementioned corresponding sub components, at least one component or operation may be omitted, or one or more other components or operations may be added. Generally or additionally, a plurality of components (e.g., modules or programs) may be integrated as one component. In this case, the integrated component may perform one or more functions of each of the plurality of components identically or in a similar manner to how they were performed by the corresponding components among the plurality of components before the integration. Further, according to various embodiments, operations performed by a module, a program, or other components may be executed sequentially, in parallel, repetitively, or heuristically. Further, at least one of the operations may be executed in a different order or omitted, or one or more operations may be added.

What is claimed is:

1. An electronic device comprising:
a communicator including a first wireless communication module configured to perform wireless communication via a first communication protocol and a second wireless communication module configured to perform wireless communication via a second communication protocol;
at least one memory storing instructions; and
at least one processor configured to execute the instructions to:
control the first wireless communication module to obtain first identification information of an external electronic device for performing wireless communication via the first communication protocol,
control the second wireless communication module to obtain second identification information for performing wireless communication via the second communication protocol, and
based on the second identification information being identified to be associated with the external electronic device according to a result of a comparison between the first identification information and the second identification information, associate the second identification information with location information of the electronic device and transmit the location information with the associated second identification information to an external server through the first wireless communication module such that the external sever determines a location of the external electronic device based on the second identification information with the location information of the electronic device.

2. The electronic device of claim 1, wherein the at least one processor is further configured to execute the instructions to:
control the first wireless communication module to transmit, toward the external electronic device, a request for the first identification information of the external electronic device.

3. The electronic device of claim 1, wherein the second identification information of the external electronic device is broadcast according to a predetermined cycle.

4. The electronic device of claim 1, wherein the location information of the electronic device includes at least one of global positioning system (GPS) information, address information, air pressure information, height information, information on a source of the location information, or a priority of the location information associated with the electronic device.

5. The electronic device of claim 1, wherein the at least one processor is further configured to execute the instructions to:
control the first communication module to obtain an IP address from a server accessed by using an access point, and obtain the location information of the electronic device based on the obtained IP address.

6. The electronic device of claim 1, wherein the at least one processor is further configured to execute the instructions to:
control the first wireless communication module to obtain at least one of GPS information, address information, or air pressure information stored in a mobile device, and obtain the location information of the electronic device by using the obtained at least one of the GPS information, address information, or air pressure information.

7. The electronic device of claim 1, wherein the at least one processor is further configured to execute the instructions to:

control the first wireless communication module to obtain the location information as an input through a mobile device.

8. The electronic device of claim 1, further comprising:
a display,
wherein the at least one processor is further configured to execute the instructions to:
control the display to display a user interface for receiving an input of the location information.

9. The electronic device of claim 1, wherein the at least one processor is further configured to execute the instructions to:
based on obtaining, from a server by using the first wireless communication module, a new IP address that is not a pre-stored IP address, output a notification requesting to correct the location information of the electronic device.

10. The electronic device of claim 5, wherein the at least one processor is further configured to execute the instructions to:
based on obtaining, from the server by using the first wireless communication module, a new IP address that is not a pre-stored IP address, obtain new location information based on the obtain new IP address, and change the location information of the electronic device to the new location information.

11. A method of controlling an electronic device, the method comprising:
controlling a first wireless communication module, configured to perform wireless communication via a first communication protocol, of the electronic device to obtain first identification information of an external electronic device;
controlling a second wireless communication module, configured to perform wireless communication via a second communication protocol, of the electronic device to obtain second identification information; and
based on the second identification information being identified to be associated with the external electronic device according to a result of a comparison between the first identification information and the second identification information, associating, by the electronic device, the second identification information with location information of the electronic device and transmitting the second identification information and the location information to an external server through the first wireless communication module such that the external sever determines a location of the external electronic device based on the second identification information with the location information of the electronic device.

12. The controlling method according to claim 11, wherein the controlling the first wireless communication module to obtain the first identification information comprises:
controlling the first wireless communication module to transmit, toward the external electronic device, a request for the first identification information of the external electronic device.

13. The controlling method according to claim 11, wherein the second identification information of the external electronic device is broadcast according to a predetermined cycle.

14. The controlling method according to claim 11, further comprising:
controlling the first communication module to obtain an IP address from a server accessed by using an access point, and obtain the location information of the electronic device based on the acquired IP address.

15. The controlling method according to claim 11, further comprising:
controlling the first wireless communication module to obtain at least one of GPS information, address information, or air pressure information stored in a mobile device, and obtaining the location information of the electronic device by using the obtained at least one of the GPS information, address information, or air pressure information.

16. The controlling method according to claim 11, further comprising:
controlling the first wireless communication module to obtain the location information as an input through a mobile device.

17. The controlling method according to claim 11, further comprising:
providing a user interface for receiving an input of the location information.

18. The controlling method according to claim 11, further comprising:
based on obtaining, from a server, a new IP address that is not a pre-stored IP address, outputting a notification requesting to correct the location information of the electronic device.

19. The controlling method according to claim 14, further comprising:
based on obtaining, from the server, a new IP address that is not a pre-stored IP address, obtaining new location information based on the obtained new IP address, and changing the location information of the electronic device to the new location information.

20. A non-transitory computer-readable storage medium storing at least one instruction executable by at least one processor to perform:
controlling a first wireless communication module, configured to perform wireless communication via a first communication protocol, of an electronic device to obtain first identification information of an external electronic device;
controlling a second wireless communication module, configured to perform wireless communication via a second communication protocol, of the electronic device to obtain second identification information; and
based on the second identification information being identified to be associated with the external electronic device according to a result of a comparison between the first identification information and the second identification information, associating the second identification information with location information of the electronic device and transmitting the second identification information and the location information to an external server through the first wireless communication module such that the external sever determines a location of the external electronic device based on the second identification information with the location information of the electronic device.

* * * * *